United States Patent
Peng et al.

(10) Patent No.: US 9,182,846 B2
(45) Date of Patent: Nov. 10, 2015

(54) ELECTRONIC DEVICE AND TOUCH INPUT CONTROL METHOD FOR TOUCH COORDINATE COMPENSATION

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Li-Xia Peng, Shenzhen (CN); Zhang-Yong Zheng, Shenzhen (CN); Fei Wang, Shenzhen (CN); Xue-Shun Liu, Shenzhen (CN); Xin Lu, Shenzhen (CN); Huan-Huan Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 296 days.

(21) Appl. No.: 13/714,313

(22) Filed: Dec. 13, 2012

(65) Prior Publication Data

US 2013/0162603 A1 Jun. 27, 2013

(30) Foreign Application Priority Data

Dec. 27, 2011 (CN) .......................... 2011 1 0444042

(51) Int. Cl.
*G06F 3/041* (2006.01)

(52) U.S. Cl.
CPC ............ *G06F 3/0416* (2013.01); *G06F 3/0418* (2013.01)

(58) Field of Classification Search
CPC ........... G06F 3/01; G06F 3/011; G06F 3/041; G06F 3/0416; G06F 3/0418; G06F 3/04842; G06F 3/0488; G06F 3/04886

USPC .................. 345/173–179; 178/18.01–18.02; 715/773, 857–858, 864–866; 382/190–203, 206, 286

See application file for complete search history.

(56) References Cited

U.S. PATENT DOCUMENTS

| | | | | |
|---|---|---|---|---|
| 6,353,434 | B1 * | 3/2002 | Akebi et al. ................... | 345/173 |
| 6,456,952 | B1 * | 9/2002 | Nathan ............................ | 702/94 |
| 7,256,772 | B2 * | 8/2007 | Morrison ....................... | 345/178 |
| 2002/0070926 | A1 * | 6/2002 | Kavanagh ..................... | 345/173 |
| 2006/0066590 | A1 * | 3/2006 | Ozawa et al. ................. | 345/173 |
| 2010/0220066 | A1 * | 9/2010 | Murphy ......................... | 345/173 |
| 2011/0032197 | A1 * | 2/2011 | Iida ................................ | 345/173 |
| 2011/0057896 | A1 * | 3/2011 | Baek ............................. | 345/173 |
| 2011/0102334 | A1 * | 5/2011 | Colley et al. ................. | 345/173 |
| 2012/0287087 | A1 * | 11/2012 | Lu et al. ........................ | 345/178 |
| 2013/0201155 | A1 * | 8/2013 | Wu et al. ....................... | 345/174 |

* cited by examiner

*Primary Examiner* — Temesgh Ghebretinsae
*Assistant Examiner* — Keith Crawley
(74) *Attorney, Agent, or Firm* — Novak Druce Connolly Bove + Quigg LLP

(57) ABSTRACT

A touch input control method comprising steps is provided: displaying an interface comprising at least one object; gathering signals as to actual touches for calibration purposes. In use, calculating coordinates of the touch; determining whether the coordinates of the actual touch match the predetermined touch coordinates of the object; creating an adjustment signal if the coordinates of the touch is not the same as the predetermined touch coordinates of any object; determining which finger used for touch input, and retrieving a touch offset direction and a touch offset distance of the determined finger of the user from a calibration database; and applying compensation to the coordinates of the touch, so as to determine the touched object. An electronic device using the touch input control method is also provided.

16 Claims, 4 Drawing Sheets

(a)

(b)

ELECTRONIC DEVICE AND TOUCH INPUT CONTROL METHOD FOR TOUCH COORDINATE COMPENSATION

BACKGROUND

1. Technical Field

The present disclosure relates to an electronic device and a touch input control method thereof.

2. Description of Related Art

Electronic devices with touch screens, mobile phones, digital photo frames, electronic readers (e-reader), for example, are popular. The user inputs information by touching objects such as icons and virtual keyboard displayed on the touch screen. Usually, each of the objects displayed on the touch screen associates with a predefined touch coordinates. When the user touches the touch screen, the electronic device detects the coordinates of the touched portion, compares and analyzes the coordinates touched with the predefined coordinates of the object, so determining the object that the user has touched. However, due to the different touch habits, such as individual parallax, different fingers used for touching, different manners and different orientations for gripping the devices, when the user touches an object displayed on the touch screen, more or less deviation occurs between the coordinates touched and the predetermined coordinates of the object, which results in wrong determinations and input errors.

Therefore, what is needed is an electronic device and a touch input control method thereof to alleviate the limitations described above.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding sections throughout the several views.

DETAILED DESCRIPTION

Figure 1:
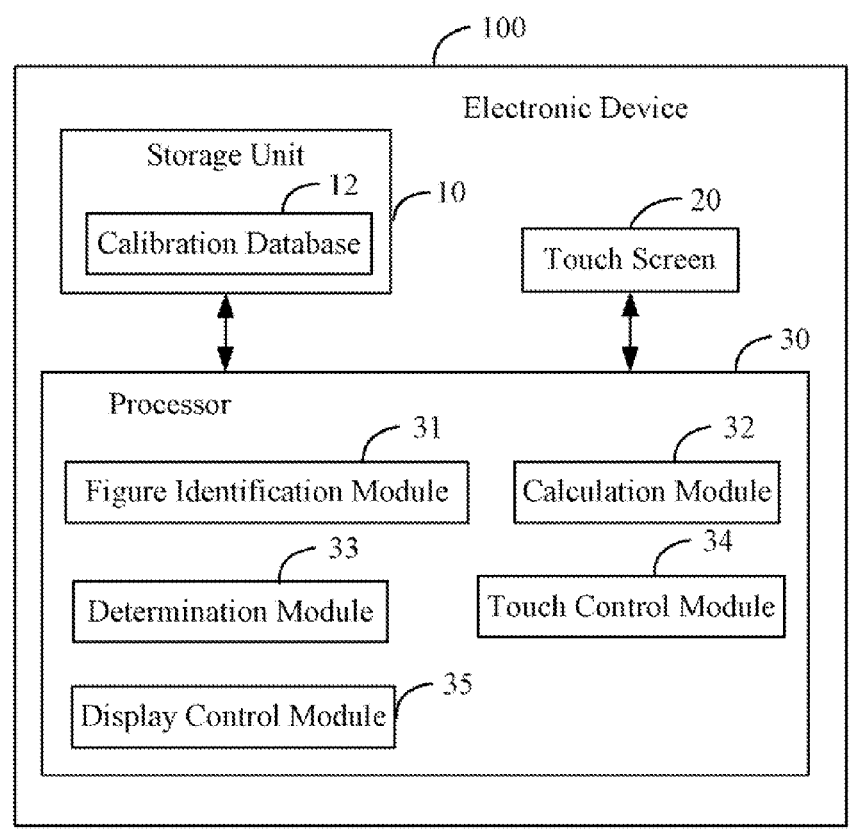
FIG. 1 is a block diagram of an electronic device in accordance with an exemplary embodiment.

FIG. 1 is an exemplary embodiment of a block diagram of an electronic device 100. The electronic device 100 can calibrate the touch position for the user, for the user to be deemed to have accurately touched the objects displayed on the touch screen. The electronic device 100 is a mobile terminal with a touch screen, such as a mobile phone. In alternative embodiments, the electronic device 100 can be other electronic devices with touch screens, such as an electronic reader, a tablet, or a digital phone frame, for example.

The electronic device 100 includes a storage unit 10, a touch screen 20, and a processor 30. The touch screen 20 generates signals in response to user touches. The user can activate the touch calibration function, do a touch calibration test, and touch the objects displayed on the touch screen 20.

The storage unit 10 stores a calibration database 12 recording touch calibration data for the fingers of a number of users. The touch calibration data of each finger includes the size of the touched area, shape of the touched area, the touch offset direction, and the touch offset distance, when a finger is attempting to touch a single object. The touch offset direction is the offset direction of the touched point relative to the point having the predefined coordinates of the object which the user intends to touch. The touch offset distance is the offset distance between the touched point and the point having the predefined coordinates of the object which the user intends to touch.

When the user activates the touch calibration function of the electronic device 100, a navigation interface is displayed on the touch screen 20 for prompting the user to do a touch calibration test for the finger or fingers of that user. The electronic device 100 also stores the touch calibration data of the user generated during the touch calibration process, in the calibration database 12. A user may be in the habit of using a particular finger or several particular fingers for inputting information via the touch screen 20. And, moreover, when a particular user using a same finger touches each object displayed on the touch screen 20, the size of the touched area, shape of the touched area, the touch offset direction, and the touch offset distance are expected to be substantially the same. Thus, before the touch calibration test, the electronic device 100 prompts the user to do the test using his/her commonly used finger(s) for touch input. If deviation exists when the user using a same finger touches different objects during the test, the electronic device 100 calculates the average value of each type of the calibration data respectively, and stores the calculated value of each type of the calibration data in the calibration database 12.

The processor 30 includes a figure identification module 31, a calculation module 32, a determination module 33, a touch control module 34, and a display control module 35.

The display control module 35 controls the touch screen 20 to display an interface including a number of objects. Each object is associated with predetermined touch coordinates. If the coordinates actually touched are the same as the predetermined coordinates associated with an object, then the function or process corresponding to the object is activated. In the embodiment, the object can be a virtual key, or a touch icon or the like.

The calculation module 32 calculates the coordinates of the actual touch according to the signals transmitted from the touch screen 20.

The determination module 33 determines whether the coordinates of the actual touch is the same as the predetermined touch coordinates of one of the objects displayed on the touch screen 20. If the coordinates of the actual touch is the same as the predetermined touch coordinates of one of the objects, the determination module 33 allows a normal signal. If the coordinates of the actual touch does not match any of the predetermined touch coordinates of the objects, the determination module 33 creates an adjustment signal and transmits the adjustment signal to the touch control module 34, the figure identification module 31, and to the calculation module 32.

When the adjustment signal transmitted from the determination module 33 is received, the figure identification module 31 identifies the shape of the portion of the finger which actually makes contact with the touch screen 20 (shape of the touched area) according to the signals transmitted from the touch screen 20, and the calculation module 32 further calculates the size of the touched area. In the embodiment, the calculation module 32 calculates the size of the touched area according to the resolution of the touch screen 20, and the size of the touch screen 20. The size of the touch screen 20 is pre-stored in the storage unit 10. The determination module 33 further determines which finger is used by the user in touching the touch screen 20 according to the size of the touched area, shape of the touched area, and the touch calibration data of the user's commonly used finger, as recorded in the calibration database 12. The determination module 33 also retrieves the touch offset direction and the touch offset distance of the finger of the user so determined from the calibration database 12, and transmits the retrieved data to the touch control module 34.

The touch control module 34 processes the coordinates of the touch of the user according to the normal touch signal and the adjustment signal transmitted from the determination module 33, so as to determine the object which the user intended to touch. In this embodiment, if a normal signal is received, the touch control module 34 determines that the object associated with the coordinates of the touch is the touched object. If the adjustment signal is received, the touch control module 34 executes the touch coordinates compensation (as hereinafter explained) for the actual touch, and determines the touched object accordingly.

In this embodiment, the touch control module 34 executes the touch coordinates compensation for the touch according to the touch offset direction and the touch offset distance of the determined finger, retrieved by the determination module 33. For example, assuming the coordinates of the touch is (x0, y0), and the touch offset direction retrieved by the determination module 33 is precisely southwest of the predetermined touch coordinates (where the touch screen is upright and due north is vertically upwards) and the touch offset distance retrieved by the determination module 33 is one unit length leftward in the horizontal direction and one unit length downward in the vertical direction relative to the predetermined touch coordinates, the touch control module 34 applies compensation equal to the total displacement, that is, the touch coordinates compensation is (x0−1, y0−1). For another example, assuming the coordinates of the actual touch are (x+1, y+1), the touch offset direction retrieved by the determination module 33 is precisely northeast relative to the predetermined touch coordinates, and the touch offset distance retrieved by the determination module 33 is one unit length rightward in the horizontal direction and one unit length upward in the vertical direction relative to the predetermined touch coordinates, the touch control module 34 applies compensation equal to coordinates is (x0−1, y1).

Figure 2:
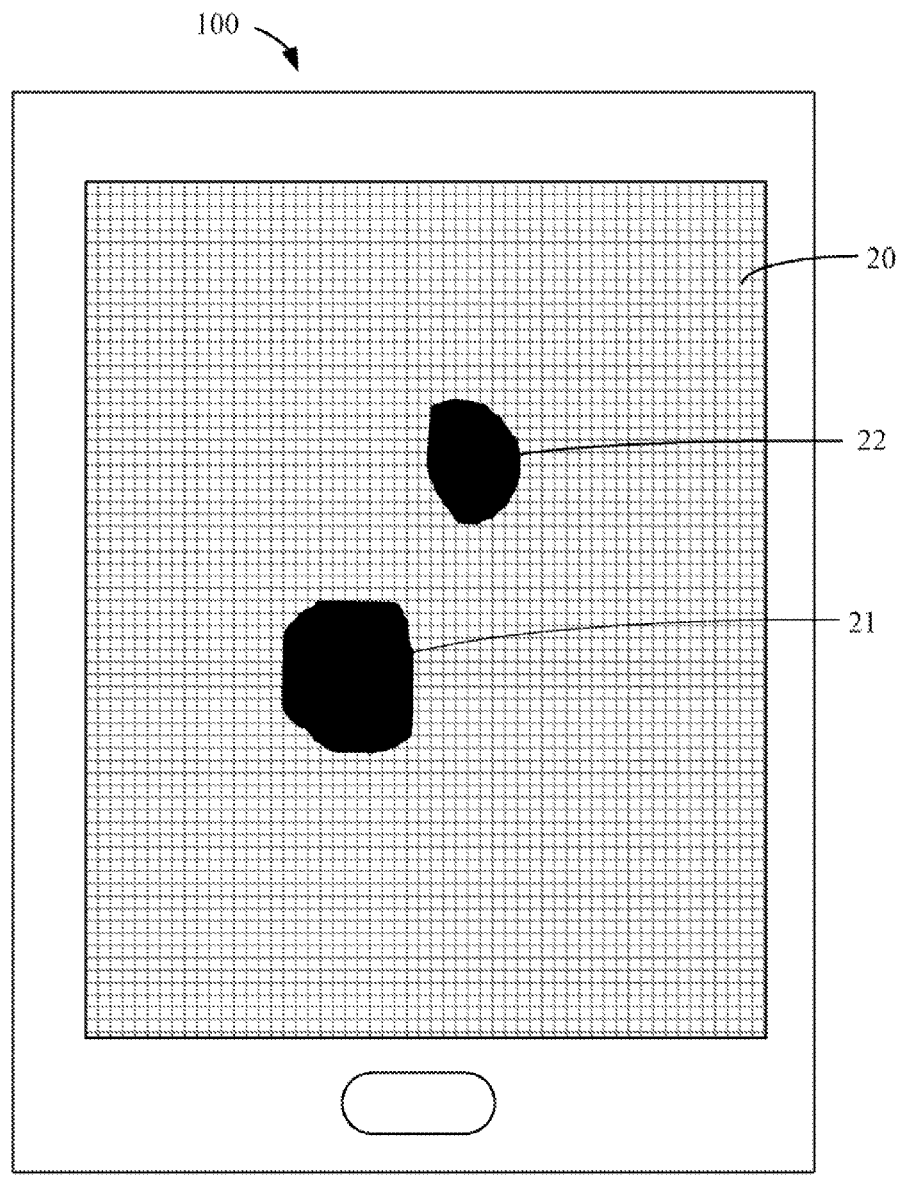
FIG. 2 is a schematic diagram showing the portions touched by a user, displayed on the electronic device of FIG. 1.

FIG. 2 shows an image 21 of the shape of the touched area of the thumb of a user, and an image 22 of the shape of the touched area of the forefinger of a user. In the embodiment, the image of the shape of the touched area of the finger is the image on the touch screen 20 of FIG. 2 which reflects the actual touched portion of the touch screen 20, by the finger of the user.

Figure 3:
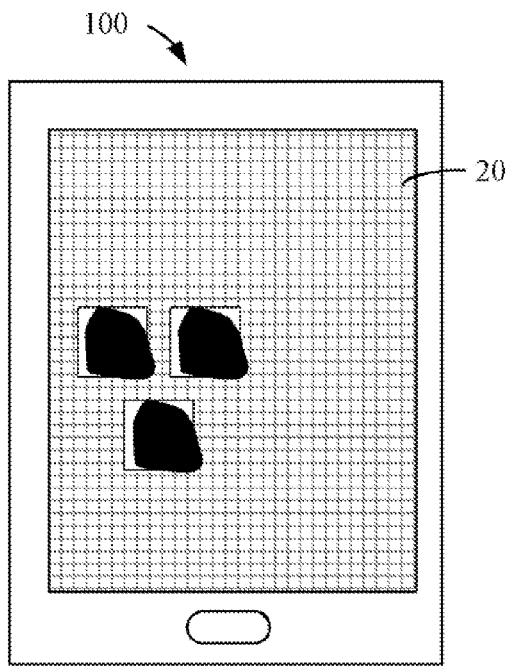
FIGS. 3(*a*) and 3(*b*) are schematic diagrams showing the portions touched by a user, displayed on the electronic device of FIG. 1.
Figure 3:
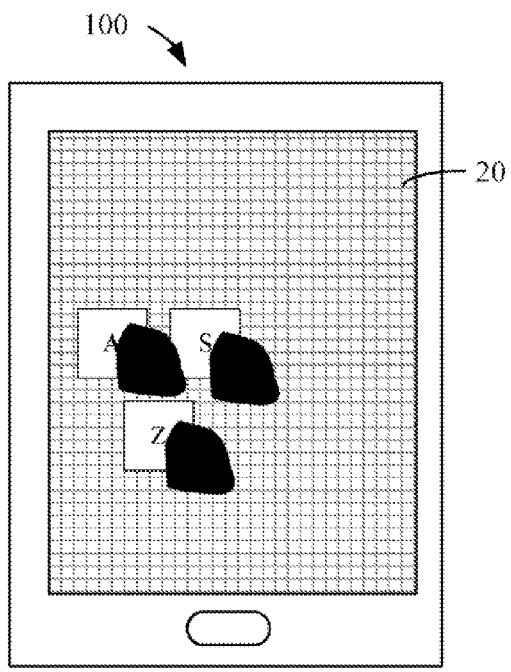

FIG. 3(a) shows an image of the shape of the touched areas of the right forefinger of a user when the key A, the key S, and the key Z are touched by the right forefinger of the user. The coordinates of the portions actually touched match the predetermined touch coordinates of the key A, the key S, and the key Z individually. In other words, the coordinates of the touch are exactly the predetermined touch coordinates; there is no offset in the touch. FIG. 3(b) shows a different situation, when a user attempts to touch the key A, the key S, and the key Z. The touched coordinates do not match the predetermined touch coordinates of the key A, the key S, and the key Z respectively, and compensation has been applied, the actual touches have touch offset direction and touch offset distance relative to the predetermined touch coordinates. Under this condition, the touch control module 34 will compensate the touched coordinates of the touch with the touched coordinates as shown in FIG. 3(a) according to the touch offset direction and touch offset distance of the finger of the user, as recorded in the calibration database 12.

In the embodiment, the storage unit 10 further stores a calibration interface including a number of objects, such as virtual keys, touch icons and the like. When the touch calibration function of the electronic device 100 is activated by the user, the display control module 35 controls the touch screen 20 to display a dialog box to invite the user to do the touch calibration test. If the user selects to do the test, the display control module 35 further controls the touch screen 20 to display the calibration interface stored in the storage unit 10, and controls a pop up dialog box to prompt the user to do the test in respect of the highlighted object. If the user confirms the test, eg. by selecting the icon "OK" displayed on the dialog box, the display control module 35 controls the objects displayed on the calibration interface to be highlighted in sequence according to a predetermined order. When the user touches the highlighted objects in sequence, the touch screen 20 generates signals in response to the touches on the object accordingly. The figure determination module 31 identifies and stores the image of the shape of the touched area of the finger of a user in the calibration database 12. The calculation module 32 calculates the size of the touched area of the finger, and calculates the coordinates of the touch according to predefined arithmetic and the signals caused by the touch. The calculation module 32 further compares the coordinates of the actual touch and the predefined touch coordinates of the object, so as to determine the touch offset direction and the touch offset distance of the finger. The calculation module 32 further stores the calculated size of the shape of the touched area, the touch offset direction, the touch offset distance of the finger, in the calibration database 12. The display control module 35 highlights the next object for guiding the user to progress through the test, until the user completes the test for all the objects displayed on the calibration interface. All of the calibration data of the user is stored in the calibration database 12.

Figure 4:
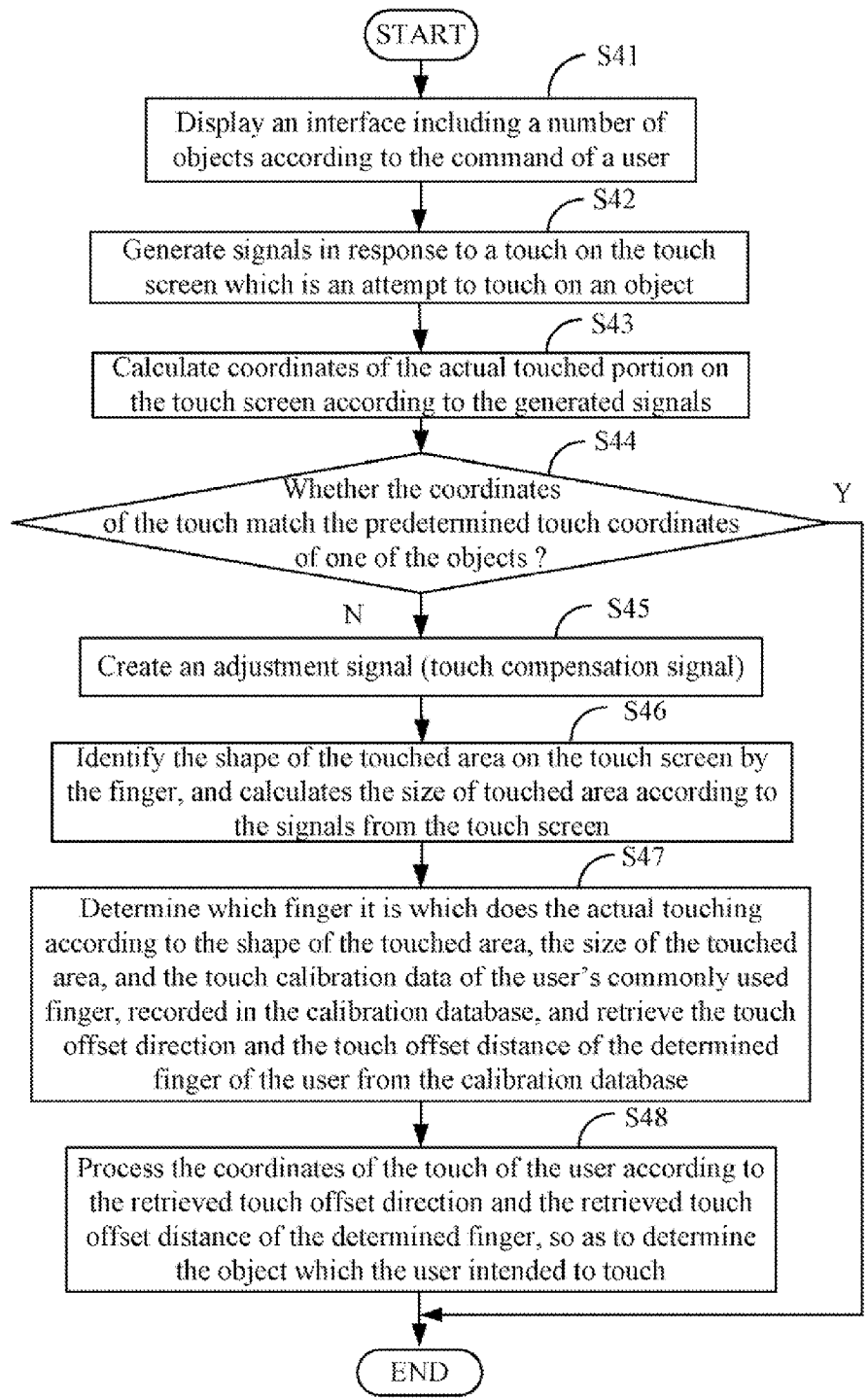
FIG. 4 is a flowchart of a touch input control method for electronic devices, such as the one of FIG. 1, in accordance with the exemplary embodiments.

FIG. 4 shows a flowchart of a touch input control method of the electronic device 100 of FIG. 1. The electronic device 100 includes a touch screen and a storage unit. The touch screen generates signals in response to the user touches. The storage unit stores a calibration database 12 recording touch calibration data for fingers of a number of users. The touch calibration data of each finger includes the shape of the screen area in contact with a finger, the size of the touched area, the touch offset direction, and the touch offset distance, when the finger touches a single object. The touch offset direction is the offset direction of the touched point relative to the point having the predefined coordinates of the object which the user intends to touch. The touch offset distance is the offset distance between the touched point and the point having the predefined coordinates of the object which the user intends to touch. The method includes the following steps, each of which is related to the various components contained in the electronic device 100:

In step S41, the display control module 35 controls the touch screen 20 to display an interface including a number of objects according to the command of a user. Each object is associated with predetermined touch coordinates. The object is a virtual key, or a touch icon or the like.

In step S42, the touch screen 20 generates signals in response to a touch on the touch screen 20 which is an attempt to touch an object.

In step S43, the calculation module 32 calculates coordinates of the actual touched portion on the touch screen 20 according to the generated signals.

In step S44, the determination module 33 determines whether the coordinates of the touch match the predetermined touch coordinates of one of the objects displayed on the touch screen 20. If yes, the process ends, otherwise, the process goes to step S45.

In step S45, the determination module 33 creates an adjustment signal (touch compensation signal) and transmits the touch compensation signal to the touch control module 34, the figure identification module 31, and the calculation module 32.

In step S46, the figure identification module 31 identifies the shape of the touched area on the touch screen 20 by the finger, and the calculation module 32 calculates the size of the touched area according to the signals from the touch screen 20. In the embodiment, the calculation module 32 calculates the size of the touched area according to the resolution of the touch screen 20, and the size of the touch screen 20.

In step S47, the determination module 33 determines which finger it is which does the actual touching according to the shape of the touched area, the size of the touched area, and the touch calibration data of the user's commonly used finger, recorded in the calibration database 12, and retrieves the touch offset direction and the touch offset distance of the determined finger of the user from the calibration database 12.

In step S48, the touch control module 34 processes the coordinates of the touch of the user according to the retrieved touch offset direction and the retrieved touch offset distance of the determined finger, so as to determine the object which the user intended to touch.

With such a configuration, after the interface is displayed on the touch screen 20 in response to the operation of the user, if the coordinates of the touch by the user do not match with a predetermined touch coordinates of one of the objects displayed on the touch screen 20, an adjustment signal is created, and the finger of the user touching the touch screen 20 is determined according to the shape of the touched area of the finger, the size of the touched area, and the touch calibration data of the user's commonly used finger recorded in the calibration database 12. The touch offset direction and the touch offset distance of the determined finger of the user are also retrieved form the calibration database 12, so as to apply compensation to the coordinates of the touch and to determine the touched object accordingly. Thus, the reliability and accuracy of the touch input is greatly improved.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A touch input control method for an electronic device with a touch screen and a storage unit storing a calibration database, the method comprising:
    displaying an interface comprising a plurality of objects, each object associated with predetermined touch coordinates;
    generating signals in response to a touch on the touch screen which is an attempt to touch an object;
    calculating coordinates of the actual touched portion on the touch screen according to the generated signals;
    determining whether the coordinates of the touch match the predetermined touch coordinates of one of the objects displayed on the touch screen;
    creating an adjustment signal if the coordinates of the touch do not match the predetermined touch coordinates of any of the objects;
    determining which finger it is which does the actual touching according to the shape of the touched area, the size of the touched area, and the touch calibration data of a user's commonly used finger, recorded in the calibration database, wherein the size of the touched area is calculated according to the shape of the touched area, the resolution of the touch screen, and the size of the touch screen;
    retrieving a touch offset direction and touch offset distance of the determined finger of the user from the calibration database; and
    compensating the coordinates of the touch of the user according to the retrieved touch offset direction and the retrieved touch offset distance of the determined finger, so as to determine the object which the user intended to touch.

2. The method as described in claim 1, wherein the step "determining which finger it is which does the actual touching" comprises:
    identifying the shape of the touched area on the touch screen by the finger;
    calculating the size of the touched area of the touch; and
    determining which finger it is which does the actual touching according to the shape of the touched area, the size of the touched area, and the touch calibration data of the user's commonly used finger recorded in the calibration database.

3. The method as described in claim 1, wherein the objects are selected from the group consisting of virtual keys, and touch icons.

4. The method as described in claim 1, wherein the calibration database records touch calibration data for fingers of a number of users, the touch calibration data of each finger includes the shape of the touched area, the size of the touched area, the touch offset direction, and the touch offset distance, when the finger touches a single object.

5. The method as described in claim 1, wherein the touch offset direction is the offset direction of the touched point relative to the point having the predefined coordinates of the object which the user intends to touch, and the touch offset distance is the offset distance between the touched point and the point having the predefined coordinates of the object which the user intends to touch.

6. An electronic device comprising:
    a touch screen generating signals in response to a touch on the touch screen which is an attempt to touch an object; and
    a processor comprising:
        a display control module, configured for displaying an interface comprising a plurality of objects, each object associated with a predetermined touch coordinates;
        a calculation module, configured for calculating coordinates of the actual touch according to the generated signals;
        a determination module, configured for determining whether the coordinates of the touch do not match the predetermined touch coordinates of one of the objects displayed on the touch screen, creating an adjustment signal if the coordinates of the touch match the predetermined touch coordinates of any of the objects, and determining which finger it is which does the actual touching according to the shape of the touched area, the size of the touched area, and the touch calibration data of a user's commonly used finger, recorded in the calibration database, and retrieving a touch offset direction and touch offset distance of the determined finger of the user from the calibration database; wherein the size of the touched area is calculated according to the shape of the touched area, the resolution of the touch screen, and the size of the touch screen; and a touch control module, configured for compensating the coordinates of the touch of the user according to the retrieved touch offset direction and the retrieved touch offset distance of the determined finger, so as to determine the object which the user intended to touch.

7. The electronic device as described in claim 6, further comprising a figure identification module configured for identifying the shape of the touched area on the touch screen when the adjustment signal is received.

8. The electronic device as described in claim 7, wherein the calculation module is further configured for calculating the size of the touched area of the touch, and the determination module further determines which finger it is which does the actual touching according to the shape of the touched area, the size of the touched area, and the touch calibration data of the user's commonly used finger recorded in the calibration database.

9. The electronic device as described in claim 6, wherein the objects are selected from the group consisting of virtual keys, and touch icons.

10. The electronic device as described in claim 6, wherein the calibration database records touch calibration data for fingers of a number of users, the touch calibration data of each finger includes the size of the touched area, the shape of the touched area, the touch offset direction, and the touch offset distance, when the finger touches a single object.

11. The electronic device as described in claim 6, wherein the touch offset direction is the offset direction of the touched point relative to the point having the predefined coordinates of the object which the user intends to touch, and the touch offset distance is the offset distance between the touched point and the point having the predefined coordinates of the object which the user intends to touch.

12. A touch input control method for an electronic device with a touch screen and a storage unit storing a calibration database, the method comprising:

determining whether coordinates of a touch applied on the touch screen match predetermined touch coordinates of one of a plurality of objects displayed on the touch screen;

creating an adjustment signal if the coordinates of the touch do not match the predetermined touch coordinates of any of the objects;

determining which finger it is which does the actual touching according to the shape of the touched area, the size of the touched area, and the touch calibration data of a user's commonly used finger, recorded in the calibration database, wherein the size of the touched area is calculated according to the shape of the touched area, the resolution of the touch screen, and the size of the touch screen;

retrieving a touch offset direction and touch offset distance of the determined finger of the user from the calibration database; and compensating the coordinates of the touch of the user according to the retrieved touch offset direction and the retrieved touch offset distance of the determined finger, so as to determine the object which the user intended to touch.

13. The method as described in claim 12, wherein the determining which finger it is which does the actual touching comprises:

identifying the shape of the touched area on the touch screen by the finger;

calculating the size of the touched area of the touch; and determining which finger does the actual touching according to the shape of the touched area, the size of the touched area, and the touch calibration data of the user's commonly used finger recorded in the calibration database.

14. The method as described in claim 12, wherein the objects are selected from the group consisting of virtual keys and touch icons.

15. The method as described in claim 12, wherein the calibration database records touch calibration data for fingers of a plurality of users; the touch calibration data of each finger includes the shape of the touched area, the size of the touched area, the touch offset direction, and the touch offset distance, when the finger touches a single object.

16. The method as described in claim 12, wherein the touch offset direction is the offset direction of the touched point relative to the point having the predefined coordinates of the object which the user intends to touch, and the touch offset distance is the offset distance between the touched point and the point having the predefined coordinates of the object which the user intends to touch.

* * * * *